W. H. COOK.
COFFEE POT.
APPLICATION FILED JULY 23, 1915.
1,188,249.
Patented June 20, 1916.
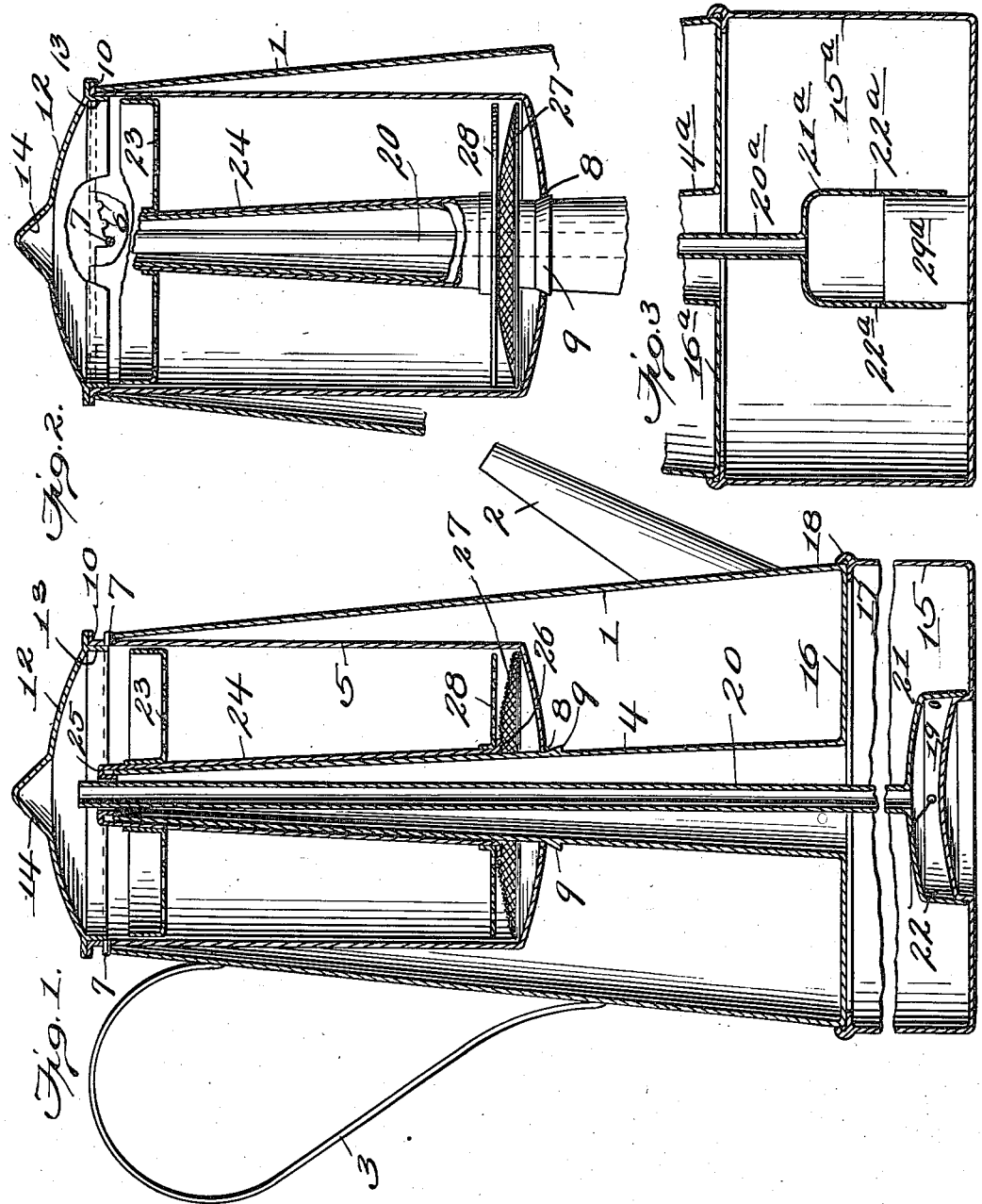
Witnesses:
Inventor
Walter H. Cook
by
Attorney

UNITED STATES PATENT OFFICE.

WALTER H. COOK, OF NEW ORLEANS, LOUISIANA.

COFFEE-POT.

1,188,249. Specification of Letters Patent. Patented June 20, 1916.

Application filed July 23, 1915. Serial No. 41,549.

*To all whom it may concern:*

Be it known that I, WALTER H. COOK, a citizen of the United States, residing at New Orleans, in the parish of Orleans and State of Louisiana, have invented new and useful Improvements in Coffee - Pots, of which the following is a specification.

This invention relates to culinary articles and has particular reference to such articles commonly known as percolators.

The main object of this invention is to construct a tea or coffee pot, or like utensil, which can be so set or adjusted as to produce a beverage of any desired strength, uniformly; and further, to have the percolating water pass through the coffee or tea but once, if desired.

It is also the object of the invention to produce a utensil of the character described of a simple construction, consisting of but few and easily accessible parts, and which is inexpensive to manufacture.

With the above objects in view, the invention consists of a beverage container, preferably assuming the formation of the usual tea or coffee pot, having a tapering core therein; a percolating chamber having an outlet opening therein through which the tapering core extends, said percolating chamber being adjustably supported within the beverage container or coffee pot whereby, upon adjustment of the percolator, the area of the outlet opening thereof is increased or reduced.

A further feature of the invention resides in providing a reservoir or water container having communication with the percolating chamber and providing a stand for removably supporting the beverage container when the parts of the utensil are assembled for operative use thereof.

Another feature of the invention resides in the provision of means for directing an overflow of water in the percolating chamber back to the water container or reservoir.

Other objects and features of the invention will appear as the description proceeds and a thorough understanding of the same is had.

In the drawings which form part of the specification: Figure 1 is a vertical sectional view of a percolator constructed in accordance with the invention; Fig. 2 is a fragmentary side section of the invention, taken substantially at right angles to Fig. 1; and Fig. 3 is a fragmentary detail view illustrating a modified construction of the water container or stand.

Like reference characters denote similar like parts throughout the specification and drawings.

Referring to the drawings, 1 denotes a beverage container or infusion vessel, preferably of a construction similar to the usual tea or coffee pot, having a spout 2 and a handle 3. As here shown, the beverage container 1 is of a frusto-conical formation having a hollow core 4 rising from the bottom at the central point thereof and gradually decreasing in diameter toward its upper or free end. Disposed within the container 1 is the cup-shaped container 5 having a central outlet opening in its bottom through which the core 4 extends. The container 5, when assembled in the beverage container 1, provides what is termed a percolating chamber. The upper edge of the beverage chamber 1 is formed at diametrically opposite points with a plurality of indentations or stops 6 evenly spaced and set on an incline so as to produce indentations varying in depth with respect to the upper edge of the container 1. The percolating chamber 5 has projecting therefrom adjacent its upper edge the pins or lugs 7 adapted to support said chamber in position within the container 1 and adjustable in the indentations 6. As shown in Fig. 1, the percolating chamber 5 extends but approximately half-way into the beverage chamber 1 and has its outlet opening 8 of sufficient size to permit the core 4 to project therethrough. Externally formed upon the core 4 intermediate its ends is the annular beveled flange or valve seat 9 adapted to coöperate with the edge of the opening 8, when the chamber 5 is adjusted to its lowermost position, to substantially close the outlet opening.

The chamber 5 has the outwardly and laterally extending annular flange 1C formed on its upper end adapted to rest upon the upper edge of the beverage container when the chamber 5 is adjusted to its lowermost position, as shown in Fig. 2, thereby forming a tight cover for the container 1. The percolating chamber 5 is provided with the cover 12 formed with the right angle flanges 13 adapted to engage with the upper edge of the chamber to form a substantially water-tight joint. The central portion of the cover 12 is depressed from its interior to provide the conical recess 14 therein, the purpose of which will be hereinafter set forth.

A water container 15, of substantially the same diameter as the bottom 16 of the container 1, is adapted to have the bottom of the beverage container 1 removably supported upon the top side thereof. The top of the water container 15 is preferably provided with an opening having an inwardly extending annular flange 17 forming the support for the bottom 16 of the container 1. An outwardly and inwardly turned flange 18 is also formed upon the upper edge of the container 15, and, preferably, provides a resilient bead for frictionally engaging the lower extremity of the beverage container 1. The central bottom portion of the water container 15 is inwardly depressed, as shown at 19. A water tube 20 is provided and is suitably formed with an enlarged end 21 having the extremities thereof in engagement with the vertical sides of the depression 19. The enlarged end 21 of the water tube forms with the indentation 19, what is termed, a water heating compartment and has communication through the perforations 22 with the water container 15. The tube 20 is of a comparatively less diameter than the smallest diameter of the hollow core 4 and extends through the latter to a distance slightly beyond its upper extremity. It will thus be seen that when the beverage chamber 1 is supported upon the water container 15, the heat over which the water container 15 is placed will be concentrated at the depressed or central portion 19 of the container 15, thus heating the water, which will ascend through the water tube 20 and discharge therefrom against the cone-shaped depression or recess 14, and thence be shed or sprayed from the latter over the contents in the percolating chamber 5. A perforated tray 23 is suitably supported in the upper portion of the chamber 5 for the purpose of evenly distributing water falling from the shed 14 over the contents in said chamber.

In the event a too large amount of water should be delivered at one time to the chamber 5, and to provide for other overflow conditions, a hollow conical sleeve 24 is provided and surrounds the portion of the core 4 within the chamber 5. The upper extremity of the sleeve 24 is provided with the inwardly and downwardly extending flange 25 adapted to hook over and rest upon the upper end of the hollow core 4, but leaving sufficient space between the tube 20 and the flange 25 to allow the water to flow downwardly through the core 4 into the water chamber 15. The perforated tray 23 is frictionally supported upon the outer periphery of the sleeve 24. The lower end of the sleeve 24 is formed with an outwardly extending annular flange 26 adapted to support the strainer 27 disposed near the outlet opening 8. The perforated tray 28 is disposed above the strainer 27 and is designed to relieve the pressure of the contents in the chamber 5 from the strainer 27.

It will be obvious that upon adjustment of the pins 7 in the indentations 6, the percolating chamber 5 may be raised and lowered with respect to the tapering core 4, which movement will increase and reduce the area of the outlet opening 8 of said chamber and regulate the flow of the water through the chamber 5. When the area of the opening 8 is reduced, it will be obvious that the water supplied to the percolating chamber 5 will flow slowly therethrough and more thoroughly steep the contents in said chamber and consequently produce a comparatively strong beverage. As the area of the opening 8 is enhanced, the flow of water through the chamber 5 will be quickened and thus produce a comparatively lighter beverage of a weaker strength. Thus, it will be understood, that as the pins 7 are adjusted in the indentations 6, beverages of varying strengths are produced.

Another improved feature of the invention is that the beverage chamber is removable from the water chamber or stand 15 and may be placed upon the table without the stand after the beverage has been made, or, in other words, the chamber or stand 15 may be kept upon the fire and the beverage or infusion vessel be removed therefrom. It will be further apparent that the present construction permits the parts to be easily dismantled for the purpose of cleaning, since the parts 5, 12, 21, 23, 24, 27 and 28 are merely held in position by frictional engagement.

The beverage produced by the present invention passes through the contents of the percolating chamber but once and the desired strength is produced by suitably adjusting the outlet opening of the chamber with respect to the tapering core 4, whereas, by most other methods, the said contents are washed by repeatedly passing the beverage or water therethrough until the desired strength and color is obtained, and which latter methods usually result in thickening the beverage with small particles of the contents or substances steeped.

The invention is not limited to the use of a flame for heating the water in the water container 15, as in some cases it is proposed to employ electric heating means. As shown in Fig. 3, the heating element 29$^a$ may be placed within a hood 21$^a$ centrally arranged in the water container 15$^a$. The hood 21$^a$ is also formed with one or more apertures 22$^a$ for the admission of water from the water container to the hood, and thence through the water tube 20$^a$.

The foregoing is a description of the preferred embodiment of the invention, but it is to be understood that such changes and variations in the construction and combination of parts may be made as fall within the scope of the appended claims.

I claim:

1. A percolator comprising a beverage container having a tapering core therein, a percolating chamber supported within said container and having a passage through which said core slidably extends, and means for supplying water to said percolating chamber, said percolating chamber and said core being relatively adjustable to vary the area of the opening between the wall of said passage and said core.

2. A percolator comprising a beverage container, a hollow tapering core centrally disposed in said container and extending from the bottom of the container, a percolating chamber in said container having an opening through which said core extends, a water chamber, and means extending through said hollow core and connecting said water and percolating chambers, said percolating chamber being adjustable on said core for regulating the flow of water through said percolating chamber.

3. A percolator comprising a beverage container, a tapering core rising centrally from the bottom of the container, the upper edge of said container being formed with a plurality of indentations varying in depth, a percolating chamber disposed within the container and having an opening through which said core extends, means carried by the percolating chamber and engageable in said indentations to vary the area of said opening, and means for supplying water to said percolating chamber.

4. A percolator comprising a beverage container, a hollow conical core rising from the bottom of said container, a percolating chamber having an opening and adapted to be adjusted at different levels within said container with said core extending through said opening, a water chamber upon which said beverage container rests, and means extending through said core for connecting said water and percolating chambers.

5. A percolator comprising a beverage container, a hollow conical core rising from the bottom of said container, a percolating chamber having an opening and adapted to be adjustably disposed within said container with said core extending through said opening, a water container removably engaging with the bottom of said beverage container, and means extending through said core for connecting said water container and percolating chamber.

6. A percolator comprising a beverage container, a hollow conical core rising from the bottom of said container, a percolating chamber having an opening and adapted to be adjustably disposed within said container with said core extending through said opening, a water chamber upon which said beverage container rests, means extending through said core for connecting said water and percolating chambers, and means associated with said percolating chamber and core whereby overflow in said percolating chamber will be directed back to the water chamber through said core.

7. A percolator comprising a beverage container, a hollow conical core rising from the bottom of said container, a percolating chamber having an opening and adjustably disposed within said container with said core extending through said opening, a water chamber associated with said container, a water tube extending from said water chamber through said core above the upper end of said core, and means within said percolating chamber to return overflow from said chamber through said core to said water chamber.

8. A percolator comprising a beverage container, a tapered core extending upwardly from the bottom of said container, a percolating chamber arranged in said beverage container and having an opening in its bottom through which said core extends, and means for vertically adjusting said percolating chamber on said core.

9. A percolator comprising a beverage container, a core extending upwardly from the bottom of said container, a percolating chamber in said container having an opening in its bottom through which said core extends, and means for directing overflow from said percolating chamber to said core.

10. A percolator comprising a beverage container, a tapered core extending upwardly from the bottom of said container, a percolating chamber in said container having an opening in its bottom through which said core extends, and means associated with said container and percolating chamber to adjustably support said percolating chamber at different levels in said container.

11. In a percolator, a beverage container having a core extending upwardly from its bottom, a percolating chamber in said container and having an opening in its bottom through which said core extends, and a sleeve in said percolating chamber surrounding said core, said sleeve having a strainer at its lower end and having its upper end overhanging the upper end of said core.

In testimony whereof I have hereunto set my hand in presence of two subscribing witnesses.

WALTER H. COOK.

Witnesses:
 JOHN RIDGLEY,
 THOMAS RIDGLEY.